June 30, 1964   M. MINDICK ETAL   3,139,406
METHOD OF PRODUCING HYDROUS METAL OXIDE SOLS
Filed Oct. 12, 1960
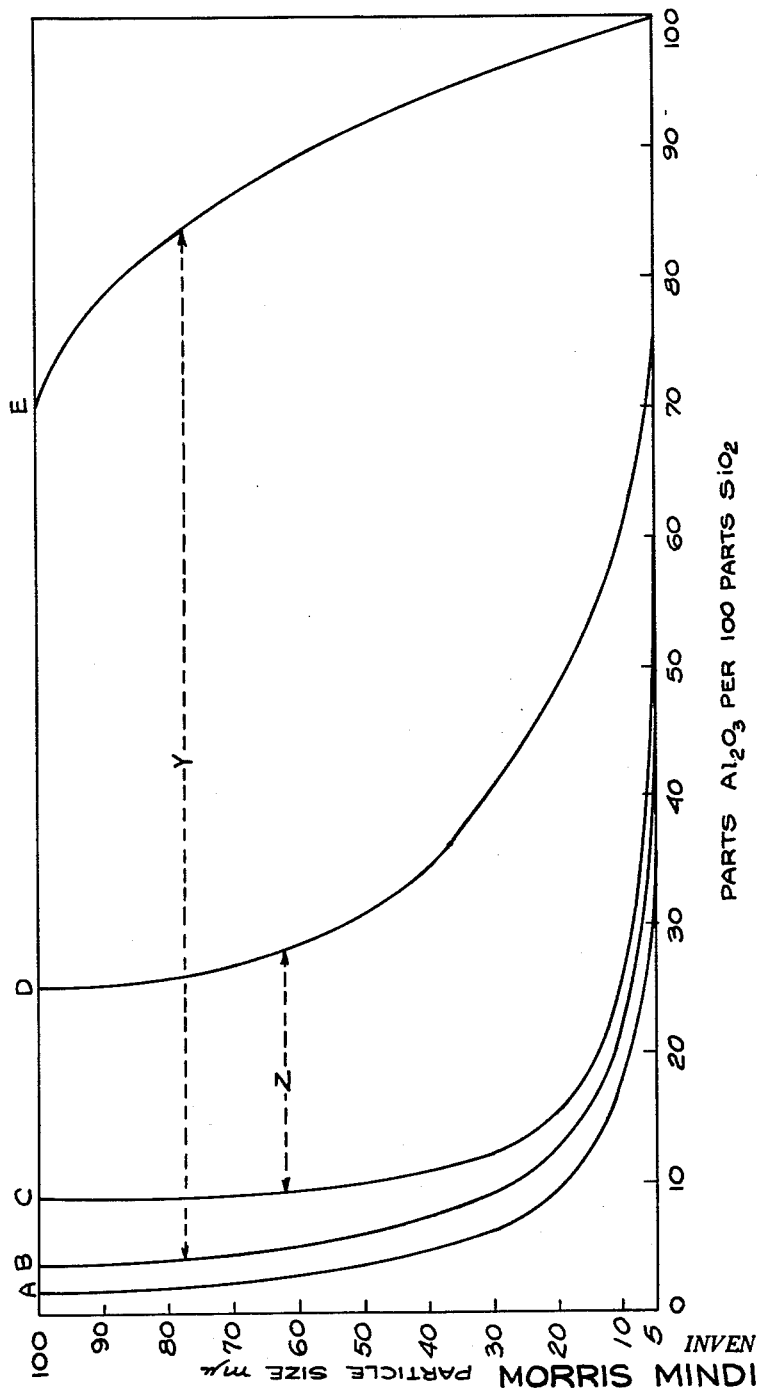
INVENTORS:
MORRIS MINDICK
LEWIS E. REVEN
By Wanzall, Johnston, Cook & Root
ATTORNEYS _United States Patent Office_

3,139,406
Patented June 30, 1964

3,139,406
METHOD OF PRODUCING HYDROUS METAL OXIDE SOLS
Morris Mindick, Chicago, and Lewis E. Reven, La Grange Park, Ill., assignors to Nalco Chemical Company, Chicago, Ill., a corporation of Delaware
Filed Oct. 12, 1960, Ser. No. 62,268
12 Claims. (Cl. 252—313)

This invention relates to hydrous metal oxide sols of trivalent metals. Specifically, the invention is directed to hydrous metal oxide sols which have properties and characteristics which are different from conventional hydrous metal oxide sols. The invention further relates to hydrous metal oxide sols which are formed about a core of silica of colloidal dimension. Also, the invention is concerned with a method of producing new and useful hydrous metal oxide sols of trivalent metals.

Hydrous metal oxide sols have been well known for many years. An early treatise describing in detail the hydrous oxide sols, as well as conventional preparative techniques for synthesizing these materials is "The Hydrous Oxides," by H. Weiser (McGraw-Hill), 1926.

Hydrous metal oxide sols are extremely interesting chemically, since they represent a class of inorganic colloids which have several interesting properties. The hydrous metal oxide sols of such metals as aluminum, gallium, indium, thallium, beryllium, zinc, cadmium, mercury, tin, and lead have not become greatly commercialized. Sols of these metal oxides are usually capable of being prepared only as extremely dilute solutions and tend to become very viscous and/or precipitate when attempts are made to concentrate these sols to usable concentrations.

Even when care is taken in preparing the hydrous metal oxide sols and they are purified, either by utilizing pure chemicals or by the removal of electrolytes at some point during their preparation, they are not particularly stable substances. Due to their instability, as well as the great deal of care that has been heretofore required during their manufacture, hydrous metal oxide sols have been overlooked as chemicals of industry.

Many of the hydrous metal oxide sols will probably not achieve any degree of commercial acceptance due to the high cost, rarity, and unavailability of several of the metals or metal compounds used in their preparation. Several metals capable of forming hydrous oxide sols by reacting compounds of these metals are those well-known metals, aluminum, iron, and chromium. While iron and chromium sols have been investigated in the research laboratory, only the alumina sols have received any degree of industrial attention.

A convenient method for preparing hydrous metal oxide sols is described in Ryznar, U.S. 2,438,230. In this patent it is suggested that a colloidal aqueous sol of a hydrous metal oxide may be produced by passing a dilute solution of an appropriate metal salt through the free base form of a weak base anion exchange resin. The simplicity of this manufacturing technique allows relatively pure hydrous metal oxide sols to be produced.

One of the disadvantages of preparing sols by using the ion exchange method is that the finished products are generally quite dilute and require further processing before a practical concentration may be obtained. The hydrous metal oxide sols made by prior art methods when concentrated to over about 6% are generally so viscous that further concentration is impractical. In U.S. Patent 2,560,707 the alumina sols, therein described, are said to have a maximum concentration of approximately 10% by weight.

If it were possible to produce hydrous metal oxide sols by a simple manufacturing technique, whereby the finished sol was relatively concentrated, non-viscous, and stable a valuable contribution to the art would be afforded. If available, such sols would have many uses in such diversified industrial applications as adsorbants for purifying various types of mixed hydrocarbon liquids and gases. They could be utilized as compact or porous carrier substances having properties similar to such well known materials as active alumina and silica gel. The sols would be of particular interest in the preparation of catalysts useful in such petroleum refining operations as cracking, desulphurization, polymerization, hydrogenation, isomerization, and the like. The products would also find further usefulness in the treatment of metal objects such as sheet metal, whereby the steel could be made non-receptive to metal coatings, e.g., galvanizing, or tin plating. Still another industrial application of improved hydrous metal oxide sols would be their use in improving the coefficient of friction between metal surfaces that tend to move one with respect to the other. A further field of usefulness for commercially practical hydrous metal oxide sols would be in the preparation of non-skid paper containers, e.g., cartons, or multi-wall kraft bags, as well as the treatment of floor waxes to render them slip resistant. Still another useful area of application for hydrous metal oxide sols having the improved characteristics described would be for employment in the treating of both porous and non-porous surfaces to render them less susceptible to soiling.

It, therefore, becomes an object of this invention to provide improved hydrous metal oxide sols, particularly hydrous metal oxide sols of trivalent metals which are readily procured, which are of high purity and which have physical and chemical characteristics, which have not, heretofore, been available or known.

A further object of the invention is to provide a method of producing hydrous metal oxide sols which is simple, economical, and results in a new and improved type of hydrous metal oxide sol. Yet another object of the invention is to furnish hydrous metal oxide sols which, due to their unique properties and characteristics, have a wide range of application in many industrial processes. Other objects will appear hereinafter.

In accordance with the invention, it has been found that hydrous metal oxide sols having new, improved, as well as interesting chemical and physical characteristics, may be prepared by treating hydrophilic colloidal silica sols with a trivalent acidic metal salt. More specifically, a trivalent acidic metal salt is dissolved into a hydrophilic colloidal silica sol, and then subsequently treated with a strong base anion exchange resin in a particular salt form which removes salts and/or acids from the system.

One of the most important features of the invention resides in the amount of trivalent acidic metal salt that is used in treating the hydrophilic colloidal silica sols. For a better understanding of the relationship between the amount of trivalent acidic metal salt used in relationship to the hydrophilic colloidal silica sol, it is wel lto consider briefly the end products of the invention.

The compositions of the invention comprise a hydrous metal oxide sol which consists of a hydrophilic liquid having dispersed, therein, particles of colloidal silica which are uniformly coated with a hydrous metal oxide. The products of the invention have properties and characteristics which correspond to the properties of many of the well known metal oxide sols. The finished products of the invention no longer evidence the properties of the colloidal silica used in their manufacture, and for this reason, the products of the invention are believed to be sols of hydrous metal oxides, rather than a blend of such sols with a silica sol or a modified silica sol.

To completely mask or negate the properties of the starting hydrophilic colloidal silica sols, it is necessary that a certain minimum amount of the hydrous metal oxide be coated upon the particles of the colloidal silica. This minimum amount is an amount in excess of the amount necessary to place a uniform monolayer of hydrous metal oxide about the surface of the silica particles contained in the colloidal silica sol. Since silica sols may be produced to give a wide variety of colloidal size particles, the quantity of hydrous metal oxide necessary to produce a coating in excess of the monolayer about the particle will be in direct proportion to the diameter of the particle of silica, as well as being related to the number of surface reactive silanol groups. The relationship between particle size and the quantity of hydrous metal oxide which may be coated on the silica sol may be expressed in terms of complex mathematical formulae; however, it is more simply shown diagrammatically. This has been done and reference may now be made to the drawing. In the drawing there are shown a series of curves or graphs bearing the designations A through E. The abscissa of the graph represents parts of hydrous metal oxide, expressed as $Al_2O_3$, per 100 parts of silica, expressed as $SiO_2$. The ordinate of the graph represents various average particle sizes in millimicrons of the colloidal silica used to prepare the sols.

With more particular reference to the drawing, Curve A shows the quantity of hydrous metal oxide required to produce a monolayer of the hydrous metal oxide about a silica particle of a given size. When the amount of hydrous metal oxide coated on the colloidal silica is at least that amount represented by Curve B in the drawing, the new and novel hydrous metal oxide sols of the invention will be produced. The amount of hydrous metal oxide represented by Curve B, as well as greater amounts, represent products which are essentially hydrous metal oxide sols coated upon a colloidal silica nucleus with the finished products having properties which no longer resemble the colloidal silica.

While Curve B in the drawing represents the minimum amount of hydrous metal oxide that may be coated upon particles of colloidal silica, larger amounts may be used with interesting hydrous metal oxide sols being produced in each instance. A general range of hydrous metal oxide that may be coated upon colloidally dispersed silica is represented by the area defined by the letter Y, lying between Curves B and E. While a wide range of products are afforded by the products defined by the area Y enclosed by Curves B and E, it has been discovered that the most valuable products of the invention are afforded when the quantity of hydrous metal oxide coated upon the colloidal silica particles falls within the area Z in the drawing, which area is defined by the Curves C and D.

Compositions within the area enclosed by Curves B and C represent products closely akin to hydrous metal oxide sols, in which effects of the colloidal silica particles are masked by the coating thereupon. While they constitute new and useful products having the desirable properties contemplated as being within the scope of the invention, they are not as desirable as "Z" area materials from the standpoint of durability of the coating. Upon use in slightly acid environment an excess of hydrous oxide coating is useful as a buffer against destruction of hydrous oxide coating by the acid. Durability of coating also becomes significant in high temperature uses. The B–C materials are typified by the one produced in Example VIII.

Materials falling within the D–E area also represent hydrous metal oxide sols which have highly desirable physical properties but are not as economically attractive as "Z" area materials due to their high hydrous metal oxide content. They have the further disadvantage of difficulty in preparation. Precautions must be taken with materials in the D–E area to avoid the production of colloidal hydrous oxide particles in addition to the coated silica particles.

One of the surprising features of the hydrous metal oxide sols of the invention is that the total solids concentration of the finished products is high as compared to conventional prior art hydrous metal oxide sols. By using the methods of this invention, it is possible to produce hydrous metal oxide sols having a total solids concentration of at least 5% by weight, with the concentration being capable of variation within the range of between 5–40% by weight. Very stable and useful products having a total solids content within the range of 15–30% by weight are easily produced.

In addition to having a relatively high total solids content, the finished hydrous metal oxide sols, in the case of alumina sols, will have a pH range of from between 4.5–6.5, with a preferred pH range being within the range of between 5.0 and 6.0, this latter pH range being extremely desirable for a stable and useful alumina sol. In the case of the ferric oxide sols, the pH of the finished sol will be between 2.0 and 3.5. The pH of the finished chromic oxide sols will be between 3.0 and 4.5.

A further important characteristic of the hydrous metal oxide sols in their freedom from electrolytes and other ionic components. They may be said to be salt free. The finished sols will in all instances have conductivities ranging from 1000 to 5000 micromhos. In the case of the alumina sols, the preferred conductivities usually will not exceed 3000. The preferred sols of the invention, e.g., those having a total solids content of between 15–30% by weight are relatively non-viscous liquids, which may be handled without the need of using special mixing equipment or agitational devices to render them fluid, as is the case in the conventional thixotropic sols of the prior art.

The sols of this invention combine the dense spherical chracteristics of colloidal silica with the surface properties of the hydrous oxides. Normally, the hydrous oxides do not form dense spherical particles. Usually their particles are very gelatinous, especially when fresh and their solutions become viscous and gel upon concentration. Although aging causes densification, a fibrous shape is assumed, especially with alumina and this causes high viscosity upon concentration. Electron micrographs of the sols of this invention show only spherical particles of about the same as or slightly larger size than the original silica particle. This indicates that the hydrous oxides have coated the colloidal silica.

The sols of the invention, as indicated, are prepared by treating particles of colloidally dispersed silica with an acidic salt of a trivalent acidic metal salt which is capable of forming an insoluble hydrous metal oxide with water. While many forms of hydrophilic colloidally dispersed particles of silica may be used as starting materials in preparing the hydrous metal oxide sols, it is preferred to use aqueous colloidal silica sols which have been deionized by contacting an aqueous colloidal silica sol with a cation exchange resin in the hydrogen form and a strong base anion exchange resin in its hydroxide form. Typical starting aqueous colloidal silica sols that may be used, either as furnished or after deionization, are those silica sols set forth below in Table I.

TABLE I

| Silica Sol | I | II | III | IV | V |
|---|---|---|---|---|---|
| Percent colloidal silica as $SiO_2$ | 15 | 30 | 35–36 | 21–22 | 49–50 |
| pH | 8.6 | 10.2 | 8.6 | 3.7 | 9.0 |
| Viscosity at 77° F., cps | Less than 5 | Less than 5 | Less than 5 | Less than 10 | Less than 20–30 |
| Specific gravity at 68° F. | 1.09 | 1.205 | 1.255 | 1.06 | 1.385 |
| Average surface area, $M^2$ per gram of $SiO_2$ | 330–340 | 190–270 | 135–190 | 135–190 | 120–150 |
| Average particle size, millimicrons | 7–9 | 11–16 | 16–22 | 16–22 | 20–25 |
| Density, #/gallon at 68° F. | 9.1 | 10.0 | 10.5 | 8.8 | 11.6 |
| Freezing point, ° F. | 32 | 32 | 32 | minus 10 | 32 |
| $Na_2O$, percent | 0.04 | 0.40 | 0.10 | 0.05 | 0.30 |

The deionization process may be conducted by passing any of the above described silica sols, as well as any other aqueous colloidal silica sols having a silica concentration within the range of 3–50% $SiO_2$, and preferably 15–35% by weight through a cation exchange resin in the hydrogen form and an anion exchange resin in the hydroxide form. The sols are preferably deionized by using a concentrated sol, e.g., 25–50% $SiO_2$, rather than a dilute sol.

An important concept that must be followed in preparing deionized sols is the utilization of a strong acid cation exchange resin which allows salt splitting reactions to occur. There are several strong acid resins that are commercially available which can be used successfully in the subject process. One such product is sold under the trademarks Nalcite HCR and Dowex 50. This product is described in U.S. Patent 2,366,007. The resin is made by the nuclear sulfonation of styrene-divinyl benzene beads. Similarly, there are many strong base resins which can be used in the process. Examples of these materials include the commercially available resins Nalcite SBR, Dowex 1, Dowex 2, Dowex 11, and Dowex 21K. Nalcite SBR and Dowex 1 and 2 are described in U.S. Patent 2,591,573. Each of the above exchange resins has a quaternary ammonium type of exchange group. The quaternary ammonium anion exchange resins are highly ionized and can be used over the entire pH range. They are capable of salt splitting reactions which convert a neutral salt to its corresponding base. A typical deionization operation to produce a preferred starting silica sol is set forth below as Example I.

*Example I*

A commercially available 35% silica sol corresponding to Sol No. III, Table I, was deionized by passing the sol through a cation exchange resin in a column. The resin was Nalcite HCR. Following this treatment, the silica sol was passed through a strong base anion exchange resin. In this instance, the resin was a commercially available product known as Nalcite SBR which is described in U.S. Patent 2,591,573. A comparison of the stability of the treated (deionized) sol and the stability of an acidized identical sol that had not been deionized, is set forth in Table II below:

TABLE II

| Untreated sol | pH[1] | Stability | | Treated sol | pH | Stability | |
|---|---|---|---|---|---|---|---|
| | | 75° F. | 120° F. | | | 75° F. | 120° F. |
| 1 | 1.0 | 1 month | | 1 | 1.0 | 2 months | |
| 2 | 2.0 | 1 month | 3 days | 2 | 2.0 | 5 months | 17 days |
| 3 | 5.0 | 18 hours | | 3 | 5.0 | 5 months | |
| 4 | 6.0 | 18 hours | | 4 | 6.0 | 5 months | 72 days |
| 5 | 7.0 | 1 month | 2 days | 5 | 7.0 | 5 months | |

[1] pH adjustments were made by adding either $H_2SO_4$ or NaOH to the sol. As is apparent from the table, the treated sol is stable under acid and neutral conditions, whereas the untreated sol is highly unstable under such conditions. It is estimated that the treated sol will have an approximate shelf life of three years at 75° F. and at a pH of 3.0.

Typical properties of deionized sols produced as described, are set forth below:

pH _____ 2.7–4.0
Percent $SiO_2$ _____ 15–50
Conductivity _____ micromhos__ 100–500
Viscosity _____ cps__ 2–100

In preparing the hydrous metal oxide sols using as starting materials the deionized aqueous sols, thus described, it is preferred that the silica concentration of the sol be adjusted to provide an $SiO_2$ concentration between 4–20% by weight, although concentrations within the range of 2 to 35% by weight may also be employed. When non-deionized silica sols are used the silica concentration will have to be somewhat more dilute and will most often be within the range of from 1 to 10% by weight. Trivalent acidic metal salts used in the coating operation with the hydrophilic colloidal silica dispersions are those trivalent acidic metal salts, which have a monovalent anion and are capable of forming an insoluble hydrous metal oxide with water. Thus, the chlorides, nitrates, nitrites, formates, acetates, fluorides, and perchlorates of the metals aluminum, chromium, iron, gallium, bismuth, ruthenium, and scandium may be employed. The sulfates, phosphates, and other divalent salts of these metals do not perform adequately in the manufacturing processes hereinafter more fully explained.

The hydrous metal oxide sols are prepared by adding the acidic trivalent metal salt to the hydrophilic colloidally dispersed silica to form a solution or reaction product, and then treating the solution with a water insoluble anion exchange resin which has as its exchangeable anion an anion of a weak volatile inorganic acid. The treatment of the solution with the resin is continued until the pH of the solution has risen by not more than 2.0 and preferably not more than 1.5 pH units and the specific conductance has dropped to not less than 30,000 micromhos. At this point the resin is removed from the system either by filtration, decantation, or the like. The solution is then heated to a temperature of at least 180° F. to about the boiling point of water for a period of time ranging from at least 15 minutes to about 2 hours. At this point the heated solution is then allowed to cool to between 100 and 140 F., at which time it is then again contacted with water insoluble anion exchange resin of the type used in the first treatment step, and resin is allowed to contact the solution for a period of time sufficient to adjust the pH of the solution to not more than 1.5 pH unit above that occurring immediately after the first resin treatment. The specific conductance is not allowed to drop below 8,000 micromhos, at which time the resin is withdrawn from the system. At this point in the process a second heating step is employed during which heating step the temperature of the solution is elevated to at least 180° F. to about the boiling point of water with the heating being controlled so as to prevent any loss of hydrophilic liquid from the system. Such expediencies as nitrogen blanketing, return of lost liquid by heat exchange means, e.g., condensers, and the like may be utilized. This second heating step is conducted for a heating time of at least 15 min. to 60 min., at which time the heat source is removed and the specific conductance of the finished sol is adjusted within the range of from 1000 to 5000 micromhos by addition of more resin. The final pH of the sol is at least 2.0 units above that of the solution before the first addition of resin.

The quantity of acidic salt used to form the solution should be of a sufficient quantity to produce the hydrous metal oxide in the amounts shown in the drawing with the least amount being that amount represented by any point on Curve B.

The acidic metal salt may be added to the silica sol either as a solid or as a solution with the solvent being the same type as used to suspend the colloidal silica. When concentrated deionized colloidal aqueous silica sols are used, it is possible to add the acidic metal salts dissolved in distilled or deionized water directly to the colloidal silica sols. This provides both a simple means for adding the acidic salt, as well as forming a suitable dilution for the starting silica sol. In the case of the deionized aqueous colloidal silica sols, it is surprising to find that the acidic salts may be dissolved therein without gelation or precipitation of the silica occurring. This is an important manufacturing advantage provided by the invention, since special handling precautions need not be observed and only simple mixing equipment to handle the mixed solution need be used The water insoluble anion exchange resin which has as its exchangeable anion an anion of a weak volatile organic acid, in nearly all instances should be strong base anion exchanger. Examples of strongly basic anion exchange resins which can be employed in the practice of the invention are those described in U.S. Patents 2,591,573; 2,597,440; 2,597,494; 2,614,099; 2,630,427; 2,632,000; and 2,632,001.

The strongly basic insoluble anion exchange resins which are preferably employed for the purpose of the invention are reaction products of a tertiary amine and a vinyl aromatic resin having halo methyl groups attached to the aromatic nuclei in the resin. Another class of anion exchange resins suitable for the practice of the invention are the reaction products of the tertiary carbocyclic or heterocyclic amines and vinyl aromatic resins having halo methyl groups attached to the aromatic nuclei in the resin. The vinyl aromatic resins employed as starting materials in making the anion resins employed in the preferred practice of the invention are normally solid benzene insoluble copolymers of a monovinyl aromatic compound and a polyvinyl aromatic compound containing from 0.5 to 40% by weight, preferably from 2.0 to 20% by weight of the polyvinyl aromatic compound chemically combined. Examples of suitable monovinyl aromatic compounds are styrene, alpha methyl styrene, chlorostyrenes, vinyl toluene, vinyl napthalene, and homologues, thereof, capable of polymerizing as disclosed, for example in, U.S. Patent 2,614,099. Examples of suitable polyvinyl aromatic compounds are divinyl benzene, divinyl toluene, divinyl xylene, divinyl naphthalene, and divinylethyl benzene. These resins are halo methylated as described, for instance, in U.S. Patent 2,614,099, preferably to introduce an average of 0.2 to 1.5 halomethyl groups per aromatic nucleus in the copolymer and then reacted with a tertiary amine to introduce a quaternary ammonium anion exchange group. Examples of suitable tertiary amines are trimethylamine, triethylamine, tributylamine, dimethylpropanolamine, dioctyl ethanolamine, and homologues thereof. The preferred tertiary amines can be described as mono and di-alkyl N-substituted alkanol and alkane diol amines.

The volatile weak inorganic acids, or more specifically the anions thereof, that are preferably used are the bicarbonate and carbonate. The sulfide, cyanide, and nitrite can also be used. Of course, due to the inherent disadvantages in using the acids or salts containing the sulfide or cyanide radical, these are less desirable for most practical purposes. The water soluble alkali metal bicarbonates are admirably suited for treating strongly basic anion exchange resins to place the resin in a form appropriate for subsequent treatment with a dilute solution of the appropriate metal halide. Excellent results have been achieved by using solutions of sodium bicarbonate. Although the water soluble alkali metal salts of these particular classes of anions are preferably used, it is apparent that other methods may be used to regenerate the resins prior to their employment in the practice of the invention.

It will be seen from the above that many of the weak volatile inorganic acids do not exist in their free acid form. Thus, for example, bicarbonic acid does not exist as such, although it may be considered as the weak acid salt of an anion exchanger which has been placed in this form by treatment with the corresponding monovalent water soluble metallic salts thereof.

To illustrate the preparation of several hydrous metal oxide sols using the general preparative techniques described above, the following examples are presented. In each example the term "resin" is used to designate the ion exchange resin sold as "Nalcite SAR," in its bicarbonate form. Wherever conductance values are given they indicate specific conductance and are expressed in terms of numerical values only. These conductance values in each instance indicate micromhos/centimeter at 77° F.

*Example II*

The 1.0 liter of a deionized silica sol containing 35% $SiO_2$, and having an average particle size of 20.5 m$\mu$ were added 0.8 liter of 10% $AlCl_3$, as $Al_2O_3$, and 0.2 liter of deionized water. This solution has an $Al_2O_3:SiO_2$ weight ratio of 0.183:1. 1000 grams of resin were added with stirring to the above solution over a period of 15 minutes and were allowed to react for 30 additional minutes. The solution was then filtered to remove the spent resin. The solution had a pH of 3.0 and a specific conductance of 50,000. The solution was heated for 40 minutes at 180–205° F. The solution was then cooled to 140° F. and 1000 grams of resin were added as before. After filtration the pH of the solution was 3.3 The solution was then heat treated as before for 40 minutes at 180–205° F. After cooling to 140° F. the final purification was accomplished by the addition of 550 grams of resin over a 30 minute interval. The sol was then filtered to remove the resin. The finished sol had a pH of 5.7, a specific conductance of 2,300, a total solids content of 22.35%. This sol was still stable after 6 months at room temperature.

*Example III*

To 3.8 liters of a deionized silica sol containing 35% $SiO_2$ and having an average particle size of 20 m$\mu$ were added 3 liters of deionized water. 1500 grams of $AlCl_3 \cdot 6H_2O$ were dissolved in this solution. This solution then had a pH of 1.8, a conductance of 88,000 and a weight ratio of $Al_2O_3$ to $SiO_2$ of 0.190:1.

3650 grams of resin were added to the above solution over a period of 30 minutes and allowed to react for an additional 30 minutes. The solution was then filtered to remove the spent resin. The spent resin was washed with 750 ml. of deionized water. This wash water was collected and added to the solution. The mixed solution had a pH of 2.5 and a conductance of 65,000. This solution was then heated to 180° F. for 30 minutes. A portion was cooled to 75° F. and found to have a pH of 2.1 and a conductance of 72,000. When the solution had cooled to 140° F., 4660 grams of resin were added over a period of 30 minutes. After allowing 30 minutes to complete the reaction, the solution was filtered to remove the spent resin. The spent resin was then washed with 750 ml. of deionized water which was added to the solution. The solution had a pH of 3.2 and a conductance of 13,000. A second heat treatment followed at 160–212° F. for 30 minutes.

The solution was cooled to 140° F. and 1150 grams of resin were added and allowed to react for 30 minutes. The solw as then filtered to remove the spent resin. The sol had a pH of 5.7, a conductance of 1800, a specific gravity of 1.132, and a solids content of 20.3%. This sol was still stable after storage for 4 months at room temperature.

*Example IV*

To 50 ml. of a deionized silica sol, containing 35% $SiO_2$ and having an average particle size of 20.5 m$\mu$, 450 ml. of deionized water were added. 100 grams of $AlCl_3 \cdot 6H_2O$ were dissolved in this solution. The pH of the solution was 1.8 and the $Al_2O_3:SiO_2$ weight ratio was 0.97:1. 450 grams of resin were added to the solution in 15 minutes and allowed to react for 30 additional minutes. The solution had a pH of 3.5 and a conductance of 30,500. The solution was heated to 170–212° F. for 30 minutes and then cooled to 80° F. The pH after the heat treatment dropped to 3.2 and the conductance rose to 36,000. 200 grams of resin were added and allowed to react for 30 minutes. The solution had a pH of 5.0 and a specific conductance of 9,000. The solution was heated to 180° F. for 30 minutes and allowed to cool overnight. The solution then had a pH of 4.9 and a conductance of 8,000. 30 grams of resin were added and allowed to react for 30 minutes. The sol was then filtered to remove the spent resin. The sol has a pH of 5.6, a specific conductance of 1,500, a specific gravity of 1.050, and a solids content of 7.95%. This sol was still stable after 6 months' storage at room temperature.

Example V

To 250 ml. of a deionized silica sol, containing 30% $SiO_2$ and having an average particle size of 12.8 m$\mu$, were added 250 ml. of deionized water. 92 grams of $AlCl_3.6H_2O$ were dissolved in the above mixture. The solution had a pH of 1.6, a conductance of 100,000, and an $Al_2O_3:SiO_2$ weight ratio of 0.244:1. 250 grams of resin were added and allowed to react for 30 minutes. The pH of the solution was 3.2 and the conductance was 58,750. After heating to 180° F. and cooling, an additional 250 grams of resin were added and reacted for 30 minutes. The solution was then filtered to remove the spent resin. The solution had a pH of 4.3 and a conductance of 14,350. The solution was then heated to 160–205° F. for 30 minutes and then cooled to 140° F.

100 grams of resin were added and reacted for 30 minutes. The sol was then filtered to remove the spent resin. The sol had a pH of 4.8, a conductance of 2500, and a solids content of 16.8%.

Example VI

To 250 ml. of a deionized silica sol, containing 15% $SiO_2$ and an average particle size of 8.4 m$\mu$, 250 ml. of deionized water were added. 95 grams of $AlCl_3.6H_2O$ were dissolved in the above mixture. The pH of the solution was 1.3, the conductance was 100,000 and the $Al_2O_3:SiO_2$ weight ratio was 0.54:1. 250 grams of resin were added to the solution over a period of 10 minutes and allowed to react for 30 minutes. The solution was then filtered to remove the spent resin. The solution had a pH of 3.0 and a conductance of 61,000. The solution was heated to 160–190° F. for 30 minutes and cooled overnight. The pH then was 2.8 and the conductance was 63,000. 200 grams of resin were added and allowed to react for 30 minutes. The solution was then filtered to remove the spent resin. The solution had a pH of 4.2 and a conductance of 20,000. A second heat treatment followed which was carried out at 160–190° F. for 30 minutes as before. The solution was cooled to 110° F. and had a pH of 4.0 and a conductance of 22,000. 100 grams of resin were added and reacted for 30 minutes. The sol was filtered to remove the exhausted resin. The sol has a specific conductance of 4,600, a pH of 4.7, and a 9.8% solids.

Example VII

To 125 ml. of a deionized silica sol, containing 35% $SiO_2$ and having an average particle size of 20.5 m$\mu$, 375 ml. of deionized water were added. 50 grams of $AlCl_3.6H_2O$ were dissolved in the above mixture to give a solution which had a pH of 1.8 and a $Al_2O_3:SiO_2$ weight ratio of 0.196:1. 150 grams of resin were added and reacted for 30 minutes. The solution was filtered to remove the spent resin. The solution had a pH of 3.3 and a conductance of 38,000. The solution was heated to 180° F. for 30 minutes and then cooled to 140° F. 100 grams of resin were added and reacted for 30 minutes before removing by filtration. The solution, which had a pH of 3.8 and a conductance of 15,500, was heated as before to 180° F. for 30 minutes. The solution was cooled to 140° F. and 65 grams of resin were added. After 30 minutes reaction time the sol was filtered to remove the exhausted resin. The sol had a pH of 5.6, a conductance of 500, and a solids of 11.3%. One portion of this sol was concentrated to 19.0% solids by boiling. This concentrated portion had a pH of 5.3 and a conductance of 750. A second portion was concentrated by boiling, to give a sol which contained 28.1% solids. It had a pH of 5.1 and a conductance of 1100. Both concentrated sols were stable at room temperature storage conditions for several months.

Example VIII

To 250 ml. of a deionized silica sol, containing 35% $SiO_2$ and an average particle size of 20.5 m$\mu$, 50 ml. of deionized water were added. 75 grams of $AlCl_3.6H_2O$ were added to the above mixture to yield a solution having a pH of 1.30 and an $Al_2O_3:SiO_2$ weight ratio of 0.144:1. To this solution 200 grams of resin were added over a 10 minute period and allowed to react for 30 additional minutes. The solution, when filtered to remove the spent resin, had a pH of 2.80 and a conductance of 50,000. The solution was heated to 160–190° F. for 30 minutes and then cooled to 80° F. This heat treatment caused the pH to drop to 2.50 and the conductance to rise to 60,000. 200 grams of resin were added and reacted as before. When filtered, the solution had a pH of 3.70 and a conductance of 12,500. The solution was heat treated as before and then allowed to cool overnight. The following day the pH of the solution was 3.3 and the conductance was 15,000. 60 grams of resin were added over a 15 minute period and allowed to react for an additional 30 minutes. When filtered, the sol had a pH of 5.40, a conductance of 2200, and a total solids of 26.1%.

Example IX

To 250 ml. of a deionized silica sol, having a $SiO_2$ concentration of 35% and an average particle size of 20.5 m$\mu$, 250 ml. of deionized water were added. To this mixture 107 grams of $FeCl_3.6H_2O$ were added to give a solution having a pH of 0.78, a conductance of 69,500, and an $Fe_2O_3$ (as $Al_2O_3$):$SiO_2$ weight ratio of 0.184:1. To this solution 250 grams of resin were added over a 10 minute period and allowed to react for 30 minutes. After filtration to remove the exhausted resin, the solution had a pH of 1.38 and a conductance of 45,000. After heating to 180° F. for 45 minutes and cooling overnight, it had a pH of 0.95 and a conductance of 57,000. 250 grams of resin were then added, reacted, and filtered off as before, yielding a solution having a pH of 2.6 and a conductance of 10,600. After a second heat treatment and subsequent cooling, the pH was 1.85 and the conductance was 13,750. A final 25 grams of resin were added, reacted, and filtered off to yield a sol having a pH of 3.2, conductance of 5,000, and a total solids of 17.0%.

Example X

To 250 ml. of a deionized silica sol containing 35% $SiO_2$ and having an average particle size of 20.5 m$\mu$, 250 ml. of deionized water were added. To this mixture 104 grams of $CrCl_3.6H_2O$ were added to yield a solution having a pH of 1.72, and a $Cr_2O_3$ (as $Al_2O_3$):$SiO_2$ weight ratio of 0.181:1. A total of 340 grams of resin were added and reacted. The solution after filtration had a pH of 3.0 and a conductance of 42,500. The solution was heated to 160–200° F. for 30 minutes and then cooled to 80° F. to yield a pH of 2.45 and a conductance of 43,800. 150 grams of resin were added over a 15 minute period to the solution. After reacting for 30 minutes, the spent resin was removed by filtration to yield a solution having a pH of 4.0 and a conductance of 13,700. The solution was then heat-treated as before and cooled. It had a pH of 3.3 and a conductance of 12,000. A final 100 grams of resin were then added and reacted as before. After filtration the sol had a pH of 4.1, a conductance of 4,000, and a total solids content of 19.5%.

As can be seen from Example VII, it is possible to produce a relatively dilute hydrous metal oxide sol which may be made more concentrated by the simple expediency of removing the continuous liquid phase of the sol from the dispersed solid phase thereof. The concentration of the sols may be conveniently conducted from a manufacturing standpoint by boiling a portion of a dilute sol and adding small, incremental portions of such sol being boiled, whereby the evaporation of the liquid is maintained at a constant level. The particle size of the starting colloidal silicas used in the above examples were varied from 8.4 to 20.5 millimicrons. This particle size range seems to give the finished hydrous metal oxide sols having the most interesting properties.

The sols of the invention, being relatively concentrated and having desirable properties of hydrous metal oxide sols without the deficiencies mentioned previously, are suitable for the preparation of adherent, and/or transparent, crack-free protective coatings on articles of all kinds. Glass plates which have been coated, for example, with a film of alumina gel will withstand temperatures of 400° C. and more without the film being destroyed. Films of alumina may be applied to show window panes and spectacle glasses (especially in gas masks) to protect them from becoming coated in moist air (breath-proof). The sols may be also used for glazing ceramic bodies, as for example, silicon articles, the bodies being subsequently fired. When employed as a varnish on wood or tapestry, the sols impart gloss and washability. The sols, if desired with an addition of other substances, are suitable for the impregnation of wood, textile, threads, fabrics, paper, and pasteboard, whether for the purpose of rendering them waterproof, protecting them from putrefaction or reducing their combustibility.

They may also be used, if desired together with gelatins, as agents for forming or stabilizing emulsions in the preparation of petroleum, wax, oil, or paraffin emulsions. The sols or the jelly particles obtained therefrom are also suitable for the preparation of concentratable thick juice from sugar beet slices, for the precipitation of floating substances in solutions of such materials as fats, starch, yeast, albumen, and gelatinous substances, and also rubber raw materials, for the enrichment of enzymes, as mordants for fabric and leather, for use in the lacquer industries, dye works, and in the preparation of yeast, wine, and beer and as substitutes for lubricants.

The sols may also be employed for the refining, desulfurizing, and deodorizing of solutions, oils, and hydrocarbons. They are also suitable as initial materials for the preparation of salts of organic acids, as for example, of acetic acid, formic acid, lactic acid, citric acid, tartaric acid, stearic acid, salicylic acid, or pyrogallol.

The sols of the hydroxides of iron, chromium, and alumina are eminently suitable as tanning agents, with the alumina sols being especially suitable for tawing. Contrasted with tawed leather obtained by tanning with alum, leather tanned with alumina sols is washable. The sols may also be employed in the preparation of colored leather.

The sols, especially the alumina sols, are excellent protective colloids in the preparation of sols or of difficultly precipitatable suspensions from metals, metalloids, and metal compounds, as for example, sulfur suspensions of sulfur and latex. They may also be employed as agents for combating dry rot, for preventing putrefaction, preserving eggs, impregnating tobacco to derive the smoke of poison, for preventing rust, polishing, washing, and cleaning, or as additions to agents employed for these purposes. They may also be employed as coagulating agents, for example, for latex, as fillers for rubber and rubber-like substances, pasteboard and paper, and for weighting silk.

They constitute excellent adhesives and cements for glass, metals, and ceramic masses; they are suitable as binding agents in the sizing of paper, in the preparation of silicon bricks, metal bricks, magnet cores, safety glass, in the briquetting of coke, mineral coal, and the like, and in the preparation of fireproof tile.

The expression "weak acid," as used herein, refers to an acid having a very low degree of ionization in water. For example, at room temperature (20° C.) the first ionization constant of hydrosulfurous acid ($H_2S$) is $9 \times 10^{-8}$; the second ionization constant is $7 \times 10^{-15}$. The first ionization constant of carbonic acid ($H_2CO_3$) is $3 \times 10^{-7}$; the second ionization constant is $7 \times 10^{-11}$. The ionization constant of hydrocyanic acid (HCN is $2.1 \times 10^{-9}$. The ionization constant of nitrous acid ($HNO_2$) is $4.5 \times 10^{-4}$. See Quantitative Analysis, by Pierce and Haenisch, 2nd Edition (1944).

In general, the anions of the anion exchange resins employed for the purpose of the invention are anions of acids having ionization constants not greater than $4.5 \times 10^{-4}$. The anion corresponding to hydrosulfurious acid is $SH^-$. The carbonate anion is $CO_3^=$. The bicarbonate anion is $HCO_3^-$. The anion of hydrocyanic acid is $CN^-$. The anion of nitrous acid is $NO_2^-$.

The term "volatile" is used in the sense that an aqueous solution of the acid when heated, to say the boiling point, evolve a gas, sometimes with decomposition of the acid.

The term "halide" as used herein refers to the metal chlorides, bromides, and iodides.

The term "acidic metal salt having a monovalent anion" is used herein to describe a metal salt which hydrolyzes in water to give an acidic solution and has a monovalent anion. Salts having multivalent anions are not used as starting materials, because such anions tend to coagulate the sols or cause growth of sol particles to a size above colloidal range.

The term "salt free colloidal silica" is used to designate the silica particles of a silica sol which has been deionized so that the system is substantially salt free.

The invention is claimed as follows:

1. The method of producing a hydrous metal oxide sol which comprises dissolving a trivalent acidic metal salt, having a monovalent anion and being capable of forming an insoluble hydrous oxide with water, into a hydrophilic colloidal silica sol having a silica concentration within the range of 3–50% $SiO_2$, contacting said solution with a water insoluble anion exchange resin which has its exchangeable anion an anion of a weak volatile inorganic acid, removing said anion exchange resin when the pH of the solution has not risen more than 2.0 pH units, heating said solution to a temperature of at least 180° F. to about the boiling point of water for at least 15 minutes, contacting said heated solution with a water insoluble anion exchange resin which has as its exchangeable anion an anion of a weak volatile inorganic acid, removing said resin from said solution when the pH has risen not more than 1.5 pH units, heating said solution to at least 180° F. to at about the boiling point of water for at least 15 minutes under conditions tending to prohibit the evaporation of said hydrophilic liquid, and then adjusting the pH of the finished product to at least 2.0 pH units above the pH of the starting trivalent acidic salt solution, with the quantity of acidic metal salt used in relation to the colloidal silica being at least the amount, calculated as $Al_2O_3$, represented by Curve B in the drawing.

2. The method in accordance with claim 1 wherein the hydrophilic colloidal silica sol is a substantially salt free aqueous colloidal silica sol having silica concentration, expressed as $SiO_2$ within the range of between 4% and 20% by weight, said sol having a pH not greater than 6.5.

3. The method of claim 1 wherein the anion exchange resin is a strong base anion exchange resin which is in the bicarbonate form.

4. The method of claim 1 wherein the acidic metal salt is from the group consisting of the chlorides, nitrates, nitrites, formates, acetates, perchlorates, and fluorides of trivalent metals from the group consisting of aluminum, chromium, and iron.

5. The method of claim 4 wherein the acidic metal salt is aluminum chloride.

6. The method of claim 4 wherein the acidic metal salt is ferric chloride.

7. The method of claim 4 wherein the acidic metal salt is chromic chloride.

13

8. The method of claim 3 wherein the strongly basic anion exchange resin is the reaction product of (1) a benzene-insoluble copolymer containing in chemically combined form from 0.5% to 40% by weight of a polyvinyl-aromatic hydrocarbon and from 99.5% to 60% of a monovinyl-aromatic compound of the class consisting of monovinyl-aromatic hydrocarbons having the vinyl radical directly attached to a carbon atom of the aromatic nucleus and nuclear halogenated derivatives thereof, which copolymer contains an average of from 0.2 to 1.2 halomethyl groups per aromatic nucleus in the copolymer, with (2) a tertiary amine selected from the group consisting of the tertiary mono- and di-alkyl N-substituted alkanol and alkanediol amines, in amount such that there is present in the reaction mixture at least one mol of the tertiary amine for each halomethyl group in the copolymer, said anion exchanger being in the bicarbonate form.

9. The method of claim 2 wherein the aqueous salt free silica sol has a conductivity within the range of between 100 and 500 micromhos and a pH within the range of between 2.7 and 4.0.

14

10. The method of claim 1 wherein the finished pH of the hydrous metal oxide sol is adjusted by adding to the solution a water insoluble anion exchange resin which has as its exchangeable anion an anion of a weak volatile inorganic acid.

11. The method of claim 1 wherein the amount of hydrous metal oxide in relation to colloidal silica is represented by the area marked Y, said area lying within the space defined by Curves B and E.

12. The method of claim 1 wherein the amount of hydrous metal oxide in relation to colloidal silica is represented by the area marked Z, said area lying within the space defined by Curves C and D.

References Cited in the file of this patent

UNITED STATES PATENTS

| | | |
|---|---|---|
| 2,733,205 | Dalton et al. | Jan. 31, 1956 |
| 2,892,797 | Alexander et al. | June 30, 1959 |
| 3,007,878 | Alexander et al. | Nov. 7, 1961 |

---

UNITED STATES PATENT OFFICE
CERTIFICATE OF CORRECTION

Patent No. 3,139,406                        June 30, 1964

Morris Mindick et al.

It is hereby certified that error appears in the above numbered patent requiring correction and that the said Letters Patent should read as corrected below.

Column 4, TABLE I, under the heading "I" and opposite "Average surface area, $M^2$ per gram of $SiO_2$", for "330-340" read -- 330-430 --; column 8, line 47, for "solw as" read -- sol was --; column 11, line 56, for "derive" read -- deprive --; column 12, line 1, for "(HCN" read -- (HCN) --; line 2, for "2.1×-0⁻⁹" read -- 2.1×10⁻⁹ --; line 8, for "hydrosulfurious" read -- hydrosulfurous --; line 14, for "evolve" read -- evolves --.

Signed and sealed this 10th day of November 1964.

(SEAL)
Attest:

ERNEST W. SWIDER
Attesting Officer

EDWARD J. BRENNER
Commissioner of Patents

UNITED STATES PATENT OFFICE
CERTIFICATE OF CORRECTION

Patent No. 3,139,406            June 30, 1964

Morris Mindick et al.

It is hereby certified that error appears in the above numbered patent requiring correction and that the said Letters Patent should read as corrected below.

Column 4, TABLE I, under the heading "I" and opposite "Average surface area, $M^2$ per gram of $SiO_2$", for "330-340" read -- 330-430 --; column 8, line 47, for "solw as" read -- sol was --; column 11, line 56, for "derive" read -- deprive --; column 12, line 1, for "(HCN" read -- (HCN) --; line 2, for "2.1×-0$^{-9}$" read -- 2.1×10$^{-9}$ --; line 8, for "hydrosulfurious" read -- hydrosulfurous --; line 14, for "evolve" read -- evolves --.

Signed and sealed this 10th day of November 1964.

(SEAL)
Attest:

ERNEST W. SWIDER
Attesting Officer

EDWARD J. BRENNER
Commissioner of Patents